INVENTOR.
William H. Engel
BY
Cromwell, Greist & Warden
Attys.

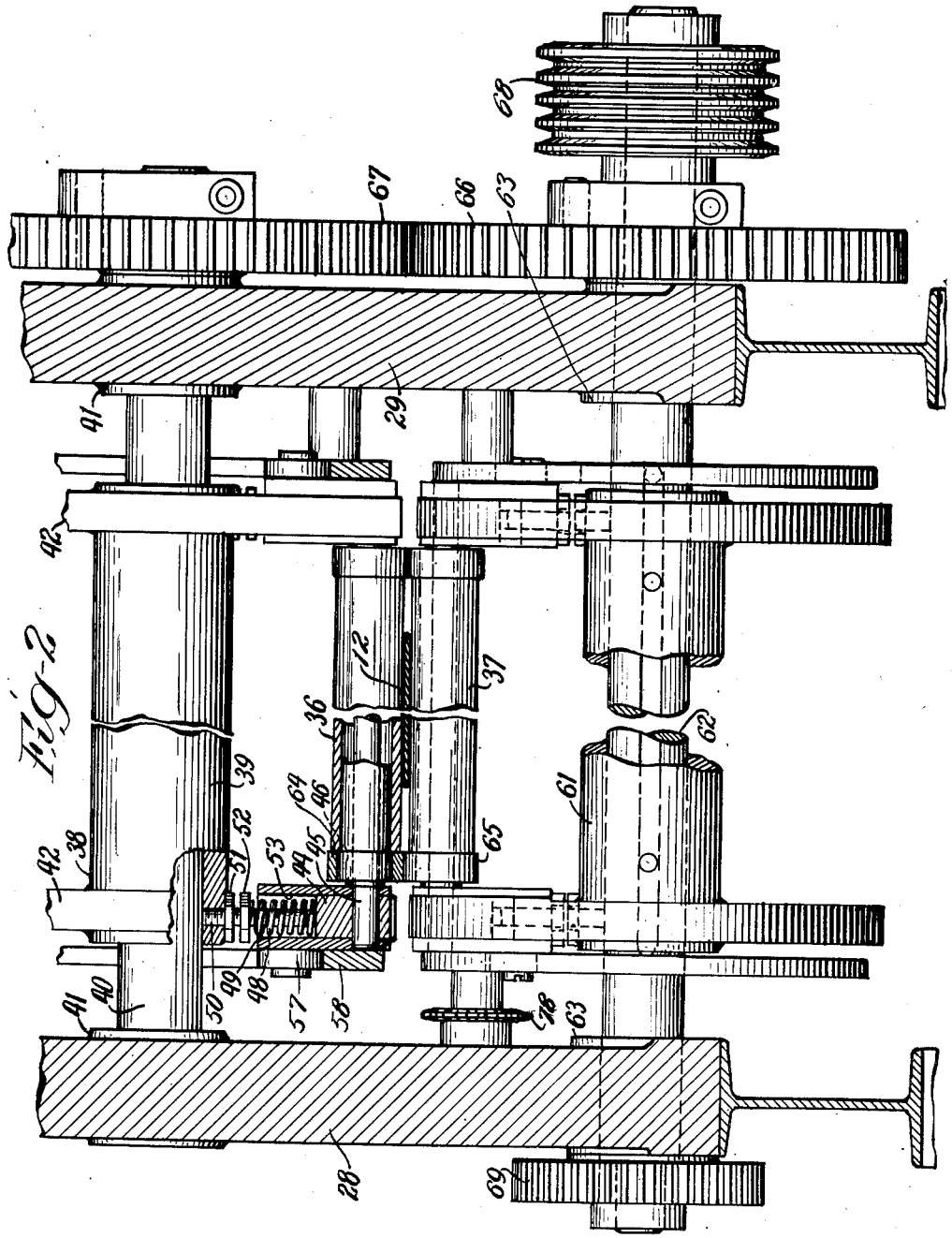

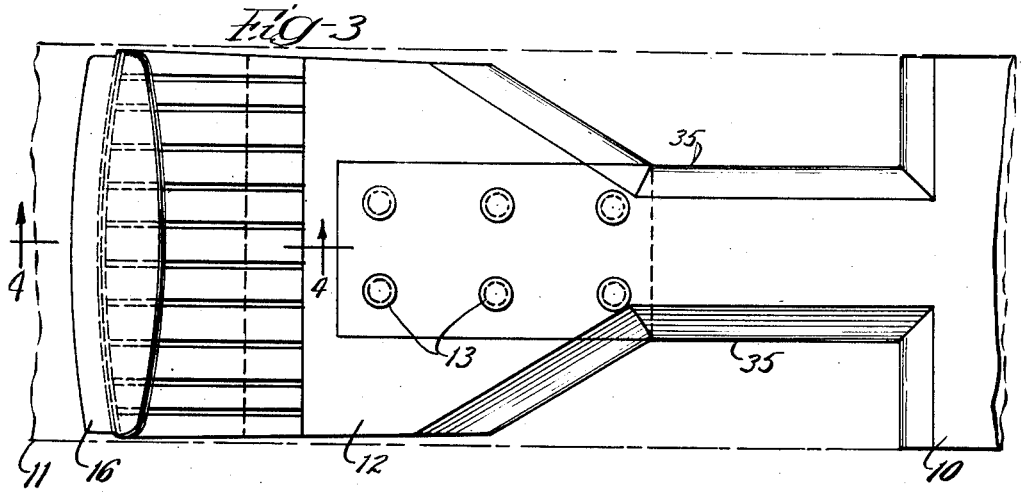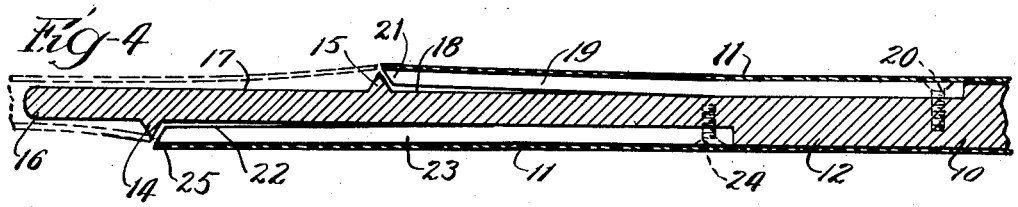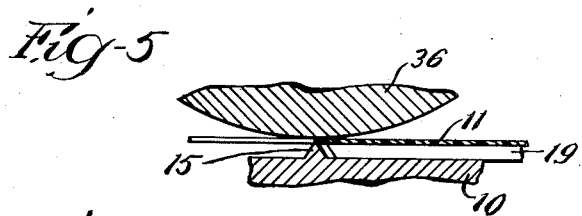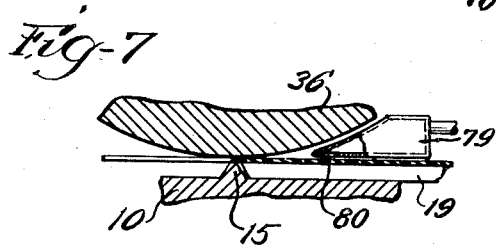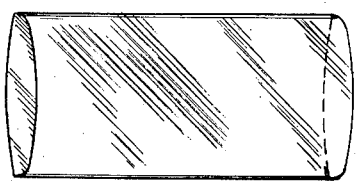

Oct. 30, 1956 W. H. ENGEL 2,768,692
CUT-OFF MECHANISM
Filed Dec. 5, 1952 4 Sheets-Sheet 4
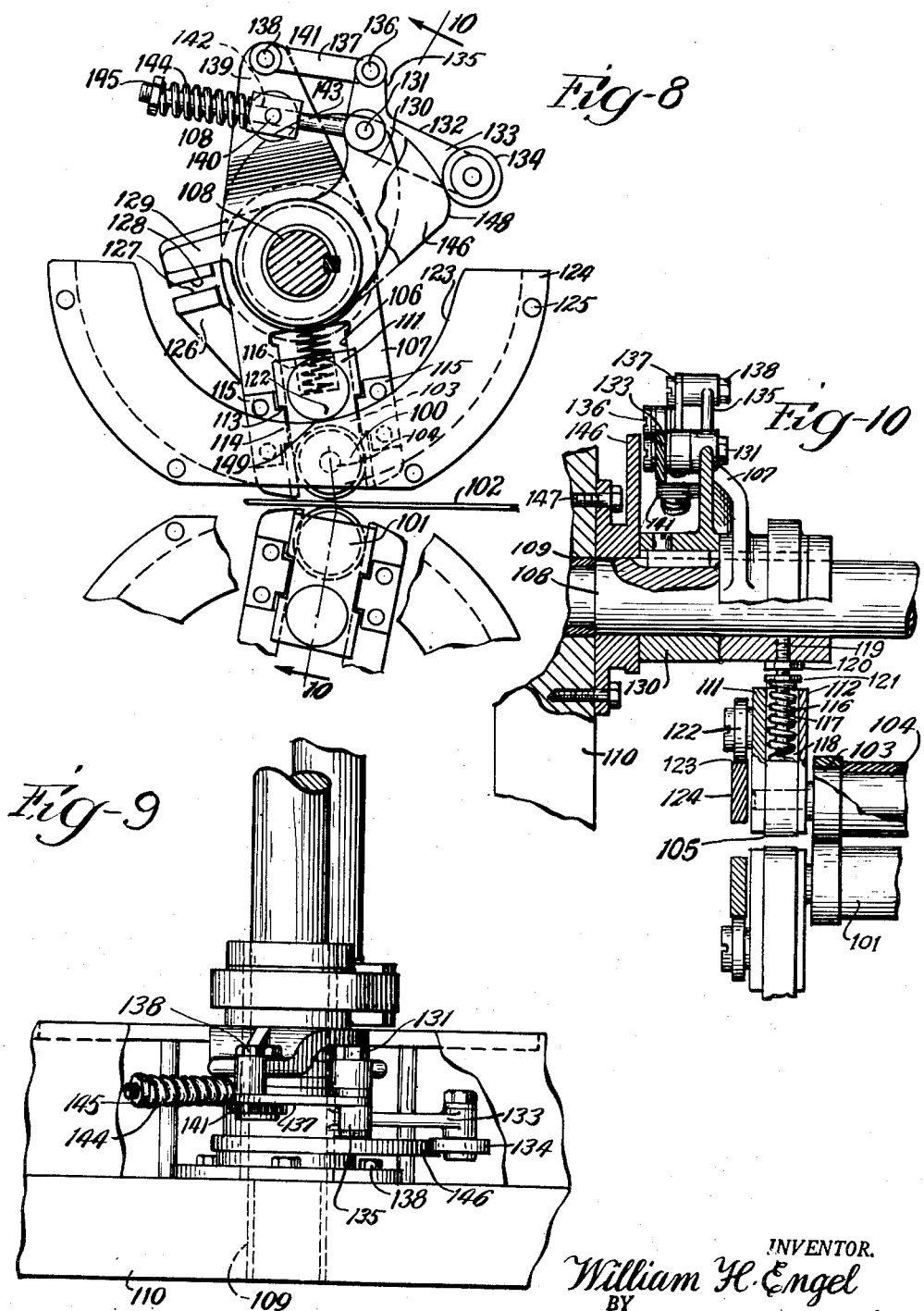
INVENTOR.
William H. Engel
BY
Cromwell, Greist & Warden
Attys.

United States Patent Office 2,768,692
Patented Oct. 30, 1956

2,768,692

CUT-OFF MECHANISM

William H. Engel, Mount Vernon, Ohio, assignor of twenty-five percent to Ira Milton Jones, Milwaukee, Wis.

Application December 5, 1952, Serial No. 324,289

9 Claims. (Cl. 164—220)

This invention relates to bag making machinery and is more particularly concerned with improved mechanism for severing tubular bag forming material to divide the same into bag lengths of the desired size.

In bag making machines of the character described in my Patent No. 2,057,295, dated October 13, 1936, a continuous web of bag forming material is fed over a former plate to tube the material, which is sealed longitudinally of the plate, and thereafter the tubed material is severed or divided by a transverse cutting operation into individual bag lengths as required, the transverse severing or cutting being accomplished by rotatably mounted transverse cutting knives which engage intermittently with opposite faces of the former plate, the former plate being reciprocated during the cutting operation to permit the tube material to be severed while it is moving continuously over the plate. With this type mechanism the reciprocating former plate slows down the speed of the operation. Consequently, its elimination has long been a desired objective in the improvement of this machine.

It is a general object of the present invention to provide a tube severing mechanism wherein rotatable members extending transversely of the tube are intermittently operable against cutting elements on a fixed former plate to sever the tube material while it is advancing continuously over the former plate.

It is a more specific object of the invention to provide in a tube forming and cutting mechanism a stationary forming plate over which the tube material is advanced, cutting knives extending transversely of the former plate on opposite faces thereof, a pair of cooperating rotatably mounted anvil members, and means for recurrently rolling said anvil members along defined linear paths over the cutting knives to thereby sever opposite sides of the tube material as it advances over the fixed former plate.

Another object of this invention resides in the provision of a mechanism of the character described featuring an anvil member which is recurrently moved bodily along a defined non-linear orbit toward and beyond a cutting zone at which a surface on the anvil member is cooperable with a fixed knife having its cutting edge lying in a plane which intersects said orbit, and wherein means is provided to effect shifting of the anvil member out of said orbit as it approaches the cutting zone and to constrain the anvil member to travel through said zone along a linear path with said surface on the anvil member just meeting the plane of the cutting edge of the knife.

It is a further object of the invention to provide a tube cutting mechanism which comprises a fixed former plate over which a web of material is advanced and formed into a tube, transversely extending cutting knives projecting on opposite faces of the fixed former plate adjacent one end thereof and having means associated therewith to normally hold the web material out of engagement with the edges of the cutting knives while it is advancing thereon and cooperating rotatably mounted anvil members adapted to intermittently engage the cutting knives and sever the tube material.

It is a still more specific object of the invention to provide in a mechanism of the type described a fixed former plate having adjacent its free end transversely extending cutting knives on opposite faces thereof and a plurality of relatively narrow, flat spring members mounted thereon and arranged with the free ends thereof adjacent the cutting edges of the knives and normally projecting beyond the outer limits of the cutting knives to hold the web material out of engagement with the edges of the cutting knives as the web material advances over the same, in combination with cooperating rotatably mounted anvil members arranged to intermittently engage against the cutting edges of the knives and sever the tube material.

It is another object of the invention to provide in a tube forming mechanism of the type described a fixed former plate having on opposite faces thereof projecting knife edges extending transversely thereof in offset relation and a plurality of spring members associated with each knife edge for normally holding the web material passing thereover out of contact with the knife edge, in combination with a pair of anvil members reciprocably mounted on opposite sides of the former plate and operable to intermittently engage the knife edges and sever the tube material.

It is a further object of the invention to provide in a cut-off machine of the type described rotatable anvil members intermittently engageable with cutting knives in a fixed former plate which anvil members have associated mechanism for increasing their speed of rotation during the time they engage the cutting knives on the former plate to eliminate undesirable buckling of the continuously traveling material during the cutting operation.

It is another object of the invention to provide in a tube cutting machine wherein transverse cutting knives are mounted on opposite faces of a fixed former plate over which the tube material passes and wherein cutting anvils are arranged to intermittently engage the cutting knives, vacuum means positioned adjacent the cutting knives and operable on the tube material to insure that it will be lifted clear of the cutting knives for advancing movement after the cut is made.

These and other objects of the invention will be apparent from a consideration of the mechanism which is shown by way of illustration in the accompanying drawings, wherein:

Fig. 2 is a transverse section taken generally on the line 2—2 of Fig. 1, with portions broken away;

Fig. 3 is a plan view of the former plate, to an enlarged scale;

Fig. 4 is a section, to a greatly enlarged scale, taken on the line 4—4 of Fig. 3;

Fig. 5 is a partial section to a greatly enlarged scale illustrating the cutting operation;

Fig. 6 is a perspective view of a tube section severed from the material;

Fig. 7 is a view similar to Fig. 5 showing a modification;

Fig. 8 is a side elevation, with portions broken away, of a modified form of the invention;

Fig. 9 is a partial plan view of the mechanism shown in Fig. 8 with portions broken away; and Fig. 10 is a fragmentary section taken generally on line 10—10 of Fig. 8.

Figure 1:
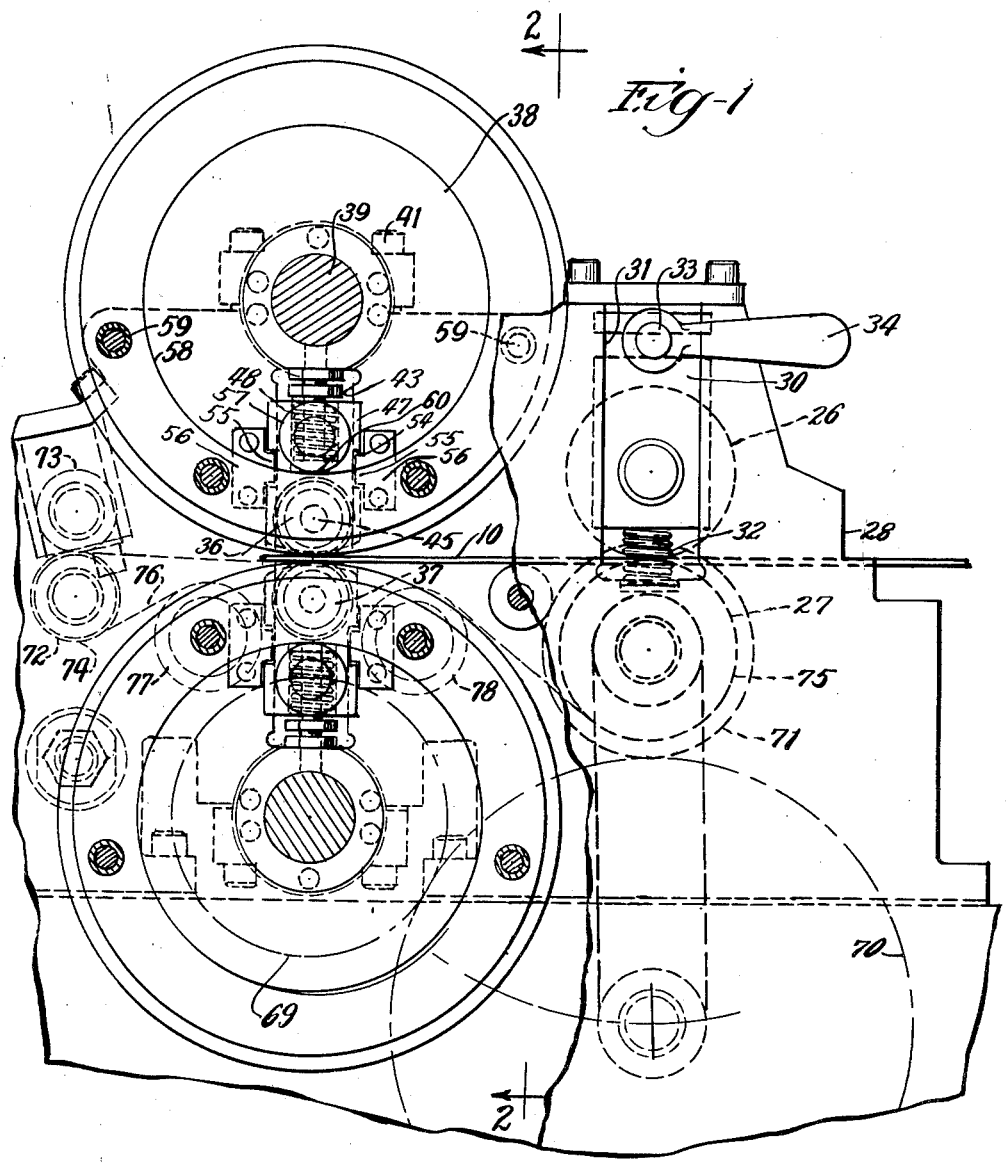
Fig. 1 is a side elevation of a portion of a bag machine having incorporated therein a cut-off mechanism embodying the principal features of the invention, with portions of the frame of the machine broken away.

Referring now to Figs. 1 to 6 of the drawings there is illustrated a cut-off mechanism incorporated in a tube forming section of a bag machine which is adapted to cut bag lengths of medium size from a continuous web of tube which has been formed as stock material.

In the mechanism illustrated the cut-off portion only of the machine is shown, it being understood that the tube forming mechanism precedes the mechanism illustrated and that the bag sections which are cut from the stock tube material is fed from the illustrated mechanism to a cooperating bottom forming mechanism which completes the fabrication of the bags.

The former plate or mandrel 10, over which the tubed bag forming material 11 is fed, extends longitudinally of the machine and is secured in fixed position in any convenient manner adjacent the forming mechanism. The former plate 10 comprises an end portion or section 12 (Figs. 3 and 4) which is a relatively flat, thin plate of generally rectangular cross section extending at the end of the former plate and secured thereto at the forward end of the plate by bolts 13, or the like. The plate section 12 is provided adjacent its free end with transversely extending cutting knife formations 14 and 15. The knives 14 and 15 are offset relative to each other, the lower knife 14 being arranged to be passed by the advancing tube after it has passed the upper knife 15 and both knives being curved transversely to cut the tube across its transverse width on curved lines so that the open mouth of the finished bag may be easily spread apart. The cutting edges of the knives, however, lie in spaced apart planes parallel to the upper and lower faces of plate 10 and plate section 12. The plate section 12 terminates at its free end with a curved lip 16 and has a flat section 17 extending to the top knife 15. The top knife 15 extends transversely of the plate 12 and has its cutting edge projecting slightly above the adjacent surfaces of the plate, the plate being cut away adjacent the knife 15 to form the same. In the cut away area 18 of plate 12 extending from the forward end of plate 10 to the knife 15, a plurality of transversely spaced longitudinally extending spring blade members 19 are arranged. Each of the spring blade members 19 is anchored or secured at its end remote from the knife by a set screw 20 and is slightly bent or curved so that its free end 21 adjacent the knife extends slightly above the top terminal edge of the knife 15 in the normal free position of the spring member. The spring members 19 are adapted to be depressed at their free ends down to the same level as the top terminal edge of the knife 15, being accommodated in the cut away space 18 of the plate section 12. A similar length of the bottom face of the plate section 12 is also cut away at 22 in advance of the knife 14 to receive another set of transversely spaced longitudinal spring blade members 23 which are secured by screws 24 and extend with their free ends 25 closely adjacent to the knife edge 14. The ends of the blades 23 normally extend slightly below the cutting edge of the knife 14 and the blades of the upper and lower sets tend to hold the tube material 11 away from contact with the cutting edges of the knives.

A pair of upper and lower draw rolls 26 and 27 are arranged between the side plates 28 and 29 of the machine, with the lower draw roll 27 being rotatably journaled in fixed relation in the side plates 28 and 29 and the upper draw roll 26 being rotatably mounted in sliding bearing blocks 30 which are in turn mounted in suitable vertical guideways 31 in upstanding portions of the side plates 28 and 29. The bearing blocks 30 are urged in the upward direction by springs 32, and cam 33, actuable by handle 34, provides for locking bearing blocks 30 in proper adjusted relation to hold the rolls 26 and 27 in engagement in a conventional manner. The draw rolls 26 and 27 feed the tube material over the plate 10 toward the plate section 12, the plate 10 having slots 35 disposed in opposite side edges thereof in which the draw rolls 26 and 27 operate. The tube material, of course, travels above or over the cutting edges of the knives 14 and 15 as it advances along the fixed plate 10, being guided over or held clear of the knife edges by the spring blades 19 and 23, respectively.

The tube material is engaged with the knives 14 and 15 by operation of a pair of anvil rollers 36 and 37 which are mounted adjacent the end of the fixed plate 10 for recurrent cooperation with the top and bottom knives 14 and 15. The top anvil roller 36 is mounted on a rotatable drum-like frame 38 for orbital motion therewith. This frame comprises a hub portion 39 secured to a shaft 40 journaled in side bearings 41 in the frame side plates 28 and 29, and includes end plates 42 which are integral with the hub portion 39. Each of the end plates 42 is provided with a radially extending slot 43 which receives in sliding relation therein a bearing block 44 in the outer end of which one end of the shaft 45 is supported. The shaft 45 carries the anvil roller 36 which is mounted thereon by means of end bearings 46. The bearing block 44 is provided with side or face plates 47 on opposite faces which are of sufficient width to extend beyond the edges of the radial slot 43 to retain the block 44 in sliding relation in the slot 43. A compression spring 48 in the inner portion of slot 43 urges the block 44 in the radially outward direction relative to frame 38. The spring 48 is seated on a threaded pin 49 which is adjustably mounted in a threaded aperture 50 in the bearing frame 38 inwardly of slot 43, and which is provided with a suitable locking nut 51 and an adjusting nut 52 for adjusting the tension of spring 48. The compression spring 48 and its guide pin 49 extend into a radial recess 53 in the slide block 44.

The side edges of the face plates 47 on the slide block 44 which extend over the edges of the slot 43 are each provided at their middle portion with a cut-out or notch 54 which receives a projecting portion 55 of a stop plate 56 secured to the end plate 42 on each side of the slide block 44. The stop plates 56 limit the radial movement of the sliding block 44. A cam roller or follower 57 is journaled on the outside face of each sliding block 44 and is held by spring 48 in engagement with a cam ring or track 58 secured by suitable connecting posts 59 to the side frame plates 28 and 29. The cam ring 58 is provided with a flat spot 60 adjacent to the cutting zone in which the knives are mounted, at the proper location to effect linear travel of the anvil roller 36 through the cutting zone for performance of the cutting operation.

The bottom anvil roller 37 is mounted in the same manner on a carrying frame 61 which rotates on a shaft 62 mounted in bearings 63 in the side frame plates 28 and 29. The anvil rollers 36 and 37 are provided at opposite ends with cooperating bearing collars 64 and 65 which engage one another as the rollers approach the cutting zone to space the cylindrical surfaces of the rollers a distance substantially exactly corresponding to the spacing between the planes of the cutting edges of the knives 14 and 15. It will thus be seen that while the cooperating bearing collars 64 and 65 assure that the spacing between the cylindrical surfaces of the anvil rollers will be substantially equal to the space between the planes of the cutting edges of the knives 14 and 15 as the rollers approach the cutting zone, the collars alone cannot assure linear travel of the rollers through the cutting zone with the surface of each tangent to the plane of the cutting edge of the adjacent knife. This latter function is performed by one or both of the cam rings 58 upon which the anvil followers 57 track, and particularly by the flat portion 60 of one or both rings. The flat portions 60 of the rings are closest to the cutting zone and are exactly parallel to the planes of the cutting edges of the knives. More important, however, is the fact that either or both of the flat spots is very accurately spaced from the plane of the cutting edge of the adjacent knife, so that as the follower 57 of one of the anvil rollers rides over it, said roller will be shifted radially inwardly of its carrier and brought to a position at which its cylindrical surface is tangent to the plane of the cutting edge of the adjacent knife. If only one cam ring is provided with such a flat spot 60, both rollers will nevertheless be shifted simultaneously to the desired positions with their surfaces tangent to the planes of the knife edges due to the cooperation between the bearing collars and the spring bias on the rollers. If both cams are provided with flat spots 60, the bearing collars may not be essential, but they are desirable nonetheless since they can be used to advantage in preventing excessive wear upon the critical portions 60 of the cam rings.

The two operating shafts 40 and 62 are driven in synchronous relation by means of connecting gears 66 and 67 at the one end of the shafts. One of the shafts 62 is suitably connected as by the pulley 68 with a source of power for driving the mechanism. At the other end the shaft 62 is provided with a change gear 69 which is in driving relation with a swing gear indicated at 70, the latter being in driving relation with the gear 71 on the end of the shaft of the drive roller 27.

A pair of take-off rollers indicated at 72 and 73 are mounted in suitable bearings in the side frame plates 28 and 29 for receiving the tube sections as they advance beyond the end of the plate 10 and are severed by the operation of the anvil rollers 36 and 37, and for advancing the cut tube sections to the bottom forming mechanism (not shown). The lower take-off roller 72 may be conveniently driven from the lower feed roller 27 by a sprocket 74 on the end of the shaft for the former, a sprocket 75 on the end of the shaft for the latter and a connecting drive chain 76, together with idler sprockets 77 and 78 which carry the drive chain 76 past the anvil frames 42 and 61.

In the operation of the cut-off mechanism the tube walls are normally held out of contact with the knives 14 and 15 by spring members 19 and 23 as the tube is advanced by the feed rollers 26 and 27. The anvil carrying frames 42 and 61 are operated at the proper speed relative to the movement of the tube to cut the tube into the desired lengths by extremely light recurrent engagement of the anvil rollers 36 and 37 with the knives 14 and 15. With relatively short bag lengths the cutting operation does not result in any substantial buckling of the tube material due to the gripping of the material between the traveling anvils and the fixed cutting knives, and the operation of the spring members 19 and 23 overcomes any tendency of the tube material to stick to or behind the knife edges as indicated in Fig. 5 the anvil rollers 36 and 37 are maintained by the bearing collars 65, and cams 58 in accurate spaced relation relative to the edges of the respective cutting knives 14 and 15 on the former plate 10 and travel always in the same path to provide a clean cut without appreciable wear on the knife edges.

As shown in Fig. 7 suction means may be provided to insure that the tube material is lifted clear of the cutting knifes as it is moved over the plate 10. An elongate hollow suction box 79 is provided which is positioned transversely of the plate 10 as close as possible to the knife 15, the box being arranged to provide clearance for movement of the anvil roller 36. A series of air holes 80 extending across the bottom edge of the box 79 provide passageways for the suction to be effective on the top surface of the traveling tube material. The box 79 is, of course, connected to a suitable source of vacuum, and a box of like character is provided adjacent the bottom knife 14 on the plate 10.

A modified form of the anvil roller arrangement is illustrated in Figs. 8 to 10, which is particularly adapted for use when the machine is employed to cut off extra long bag lengths and it is desirable to have the anvil members travel at a faster speed when contacting the cutting knives on the fixed plate to eliminate the tendency of the tube material to buckle when the cutting operation occurs.

Referring to Figs. 8 to 10 the anvil rollers 100 and 101 are supported in rotatable frames arranged on opposite sides of the fixed plate 102. The arrangement of the rollers 100 and 101 in the supporting frames is identical and only one will be described in detail.

The roller 100 is mounted in suitable end bearings 103 on a shaft 104 which is extended at each end and supported in a block 105, the latter being slidably received in a slot 106 in a carrier or bracket arm 107. The arm 107 is pivotally mounted on a supporting shaft 108 which is in turn supported in suitable bearings 109 in the frame side plates 110. The slot 106 extends radially of the shaft 108 and the bearing block 105 is retained in sliding relation therein by outer and inner face plates 111 and 112. The plate 111 is slotted or notched at 113 along opposite side edges for receiving the abutment forming portion 114 of stop plates 115 bolted or otherwise secured to the arm 107 adjacent the edges of the radial slot 106. The bearing block 105 is urged in the radially outward direction by a compression spring 116 which is mounted on a guide pin 117 and extends into recess 118 in the block 105. The guide pin is held in threaded engagement in an aperture 119 in the carrying arm 107, by means of lock nut 120 and the tension in the spring 116 is adjusted by nut 121. The bearing block 105 carries a cam roller 122 mounted on the face plate 111. The roller 122 engages the cam track 123 on cam plate 124 which is secured by suitable bracket or post members 125 to the frame plate 110. The supporting arm 107 carries a radially extending, projecting side bracket 126 which has thereon an abutment surface forming a stop member 127 adapted to engage with a corresponding stop member 128 on one end 129 of a supporting arm member 130 which is also keyed to the shaft 108 and which rotates therewith. The opposite end of the arm member 130 carries a pin 131 which is a pivot support for a bell crank 132 having on the arm 133 thereof a cam roller 134 and on the end of the other arm 135 a pivot 136 connecting thereto one end of a link 137. The link 137 is pivotally connected at the other end at 138 with the other end 139 of the supporting arm 107. A pivot pin 140 is provided on the end 139 of the supporting arm 107 which supports thereon a block or swivel 141 which receives in sliding relation in aperture 142 a link 143. The link 143 is pivoted at one end on pin 131 and is provided on its outer end with a compression spring 144 which is adjustably secured thereon by a cap nut 145. A plate cam 146 is provided which is secured by bolts 147 to the frame side plates 110 and which has a cam track 148 on which the cam roller 134 on the arm 133 of bell crank 132 engages.

In operation the cam roller 134 engages the cam track 148 as the shaft 108 rotates the arm 130 and the link 137 causes the roller supporting arm 107 to rotate also with the shaft. As the cam roller 134 moves clockwise around the cam track 148 the bell crank 132 pivots counter-clockwise about the pivot 131 and through the link connection 137 compresses the spring 144. When the cam roller 134 reaches the high point of the cam track 148 the cam drops away sharply allowing the spring 144 to sharply increase the speed of rotation of the arm 107 relative to the speed of the shaft 108 which occurs when the cam roller 122 reaches the flat spot 149 provided on the cam track 123 for the cutting operation, so that at the instant the cut is made the anvil roller 100 is traveling at a sufficient rate of speed about the shaft 108 to prevent undesirable buckling of the tube material.

In both forms of the mechanism the rotating anvils perform the transverse cutting operation on opposite sides of the flattened tubular material by striking the cutting knives on the fixed former plate. The cutting operation is relatively fast and the tubular material is held against the knife edges only a very short time during which the travel of the material is interrupted. The slight buckling of the material is outwardly of the knife edges due to the action of the spring members 19 and 23. The curvature in the knife edges is sufficient to provide offset cuts in the side walls of the tube as shown in Fig. 6 thus producing a lipped bag, which is more easily opened for filling.

I claim:

1. A cut-off mechanism for dividing a continuous tube of stock material into a plurality of cut sections of predetermined length, said mechanism comprising a relatively thin, flat, stationary plate over which the tube material is continuously advanced, said plate having transversely extending knife formations projecting on opposite faces thereof, continuously rotating frames mounted adjacent opposite faces of said plate, said frames having radial guideways, shaft supporting blocks in said guideways, cross shafts supported in said blocks, anvil rollers on said shafts, means resiliently urging said supporting blocks outwardly of the center of rotation of said frames, and cam means limiting the movement of said blocks, whereby said anvil rollers are intermittently engaged with said knife formations on said plate to cut the tube material.

2. A cut-off mechanism for dividing a continuous tube of stock material into a plurality of cut sections of predetermined length, said mechanism comprising a relatively thin, flat, plate over which the tube is continuously advanced at a predetermined rate of speed, said plate having transversely extending cutting edges projecting outwardly of the opposite faces thereof, cross shafts mounted adjacent the opposite faces of said plate, means for rotating said cross shafts at a predetermined speed, frame members mounted for relative rotation on each of said cross shafts, said frame members having radial guideways, roller shaft bearing members in said guideways, an anvil roller carried by said shaft bearing members, means for resiliently urging said shaft bearing members radially outward, means for limiting the outward movement of said shaft bearing members, link members connecting said frame members for rotation with the cross shaft on which they are mounted, a compression spring associated with said link members and cam means for compressing said spring during a predetermined portion of the rotative movement of said frame members and for thereafter releasing said spring to increase the rotative speed of said frame members relative to the speed of rotation of the cross shaft whereby said anvil roller is moved into cooperative tube cutting relation with a cutting edge on said plate while said anvil roller is being moved by said frame members at an increased rate of speed relative to the speed of rotation of the cross shaft on which said frame members are mounted.

3. A cut-off mechanism for dividing a continuous tube of stock material into a plurality of cut sections of predetermined length, said mechanism comprising a relatively thin, flat, plate over which the tube is continuously advanced at a predetermined rate of speed, said plate having transversely extending cutting edges projecting outwardly of the opposite faces thereof, cross shafts mounted adjacent the opposite spaces of said plate, means for rotating said cross shafts at a predetermined rate of speed, frame members mounted for relative rotation of said cross shafts, said frame members having radial guideways, roller shaft bearing members mounted in said guideways, anvil rollers carried by said shaft bearing members, means for resiliently urging said shaft bearing members radially outwardly, bearing collars of greater diameter than said anvil rollers associated with said anvil rollers for limiting the movement of said anvil rollers toward each other, link members for linking said frame members to rotate with the cross shafts on which they are mounted, spring members associated with said link members and cam means for cocking said spring members during a predetermined portion of the rotative movement of said frame members and for thereafter releasing said spring members to increase the rotative speed of said frame members relative to the speed of rotation of the cross shaft whereby said anvil rollers move into cooperating tube cutting relation with the cutting edges on said plate while said anvil rollers are moved by said frame members at an increased rate of speed relative to the speed of rotation of the cross shaft on which said frame members are mounted.

4. Mechanism for cutting off predetermined lengths from bag stock material in tubular form as the material moves continuously in one direction at a substantially uniform rate of speed through a cutting zone, said mechanism comprising: a fixed substantially flat plate adapted to fit inside the continuously moving flattened tube of stock material, said plate having a portion thereof lying in said cutting zone; a pair of cutting knives on the opposite faces of said portion of the plate and having transversely extending cutting edges projecting outwardly in opposite directions from the plate and lying in spaced parallel planes, over which the flattened tube of stock material to be cut passes; a pair of anvil members, one at each side of said plate and each having a surface thereon cooperable with the adjacent knife edge to cut stock material interposed therebetween; carriers for said anvil members for recurrently moving the same bodily through the cutting zone at the same time and in the same direction that the stock material travels therethrough, along paths which converge toward the cutting zone and tend to bring said surfaces on the anvil members closer together at the cutting zone than the spacing between said planes containing the cutting edges of the knives; means mounting said anvil members on the carriers for limited movement relative thereto in opposite directions substantially normal to their paths of bodily movement with the carriers; biasing means acting upon each of said anvil members to yieldingly resist spreading apart thereof relative to the carriers as they pass through the cutting zone; and means operable upon said anvil members as they approach the cutting zone for shifting the members relative to the carriers, in opposition to said biasing means, to positions at which said surface on each anvil member just meets the plane of the cutting edge of the adjacent knife, and for holding the anvil members in said shifted positions until they have passed the cutting zone so as to thereby assure linear bodily motion of the anvil members through the cutting zone.

5. The mechanism set forth in claim 4 wherein said last named means includes a follower on each of the anvil members, and a pair of stationary guides adjacent to the cutting zone, each having a guiding surface lying in the path of travel of the follower on one of said anvil members, and upon which said followers track as the anvil members pass through the cutting zone.

6. The mechanism set forth in claim 4 wherein said last named means includes cooperating means on the anvil members brought into interengagement with one another as the anvil members approach the cutting zone and maintained in engagement during the passage of the anvil members through the cutting zone, for conforming the spacing of said surfaces on the anvil members to that of said planes containing the cutting edges of the knives.

7. Mechanism for cutting off predetermined lengths from bag stock material in tubular form as the material moves continuously in one direction at a substantially uniform rate of speed through a cutting zone, said mechanism comprising: a fixed substantially flat plate adapted to fit inside the continuously moving flattened tube of stock material, said plate having a portion thereof lying in said cutting zone; a pair of cutting knives on the opposite faces of said portion of the plate and having transversely extending cutting edges projecting outwardly in opposite directions from the plate and lying in spaced parallel planes, over which the flattened tube of stock material to be cut passes; a pair of anvil rollers at opposite faces of the plate, each having its axis transverse to said plate and parallel to the adjacent face thereof, and having a cylindrical surface thereon cooperable with the adjacent knife edge to cut stock material interposed therebetween; carriers for said anvil rollers for recurrently moving the same bodily through the cutting zone at the same time and in the same direction that the stock material travels therethrough, along paths which converge toward the cutting zone and tend to bring said cylindrical surfaces on the rollers closer together at the cutting zone than the spacing between said planes containing the cutting edges of the knives; means mounting said anvil rollers on the carriers for rotation on their axes and for limited bodily movement relative thereto in opposite directions substantially normal to their paths of bodily movement with the carriers; biasing means acting upon each of said anvil rollers to yieldingly resist spreading apart thereof relative to the carrier means as they pass through the cutting zone; spacer collars on the end portions of each of said rollers spaced apart axially of the rollers a distance greater than the transverse dimension of said plate so as to clear the same during travel of the rollers through the cutting zone, said spacer collars engaging with one another as the rollers approach and travel through the cutting zone to hold the rollers with their cylindrical surfaces spaced apart a distance substantially exactly corresponding to the spacing of said planes containing the cutting edges of the knives; and means operable upon one of said anvil rollers as it approaches and travels through the cutting zone for shifting said one roller relative to its carrier to a position at which the cylindrical surface thereof is substantially exactly tangent to the plane of the cutting edge of the adjacent knife, said last named means cooperating with said collars and the biasing means on the other roller to assure positioning of said other roller with its cylindrical surface substantially exactly tangent to the plane of the cutting edge of its adjacent knife throughout the travel of said other roller through the cutting zone.

8. The mechanism set forth in claim 7 wherein said carriers comprise a frame carrying each anvil roller, and means mounting said frames for rotation on fixed axes spaced from the opposite faces of said plate and parallel thereto, with said axes lying in a common plane passing transversely through the cutting zone and substantially normal to said planes of the cutting edges of the knives.

9. Mechanism for cutting sheet material as it moves continuously in one direction at a substantially uniform rate of speed through a cutting zone, said mechanism comprising: a fixed substantially flat plate having a face along which said sheet material is constrained to travel, said plate having a portion thereof lying in said cutting zone; a cutting knife on said portion of the plate having a cutting edge lying in a plane parallel to said face of the plate, and over which the sheet material to be cut passes; a freely rotatable anvil roller adjacent to said face of the plate, having its axis arranged transversely of and parallel to said face of the plate, said roller having a cylindrical surface thereon cooperable with said knife edge to cut sheet material interposed therebetween; a carrier for said anvil roller for recurrently moving the same bodily through the cutting zone in the same direction as said sheet material travels therethrough, with the cylindrical surface of the anvil roller travelling along a path which is curved convexly with respect to and converges toward the plane of the cutting edge of the knife; means mounting the anvil roller on the carrier for bodily motion therewith and for motion relative thereto in opposite directions substantially normally to the path of bodily motion of the roller with the carrier; means acting upon the roller for normally holding the same against motion relative to the carrier; and means operable upon the roller as it approaches the cutting zone for shifting the roller relative to the carrier out of said curved path and for constraining the roller to travel linearly through the cutting zone with its cylindrical surface tangent to said plane of the cutting edge of the knife.

References Cited in the file of this patent

UNITED STATES PATENTS

| | | |
|---|---|---|
| 753,061 | Gates | Feb. 23, 1904 |
| 1,144,630 | Avery | June 29, 1915 |
| 1,208,019 | Roney | Dec. 12, 1916 |
| 1,616,752 | MacDonald | Feb. 8, 1927 |
| 1,651,096 | Molins | Nov. 29, 1927 |
| 1,907,256 | Freeman | May 2, 1933 |
| 1,970,352 | Wohlrabe | Aug. 14, 1934 |
| 2,053,030 | Hall | Sept. 1, 1936 |
| 2,142,213 | Sauerman | Jan. 3, 1939 |

FOREIGN PATENTS

| | | |
|---|---|---|
| 541,897 | Great Britain | Dec. 16, 1941 |
| 608,175 | Great Britain | Sept. 10, 1948 |